US010618725B2

(12) United States Patent
Pham et al.

(10) Patent No.: US 10,618,725 B2
(45) Date of Patent: Apr. 14, 2020

(54) SYSTEM AND METHODOLOGY FOR DELIVERING BULK MATERIAL AT A WORK SITE

(71) Applicant: Schlumberger Technology Corporation, Sugar Land, TX (US)

(72) Inventors: Hau Nguyen-Phuc Pham, Houston, TX (US); Jonathan Wun Shiung Chong, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/714,688

(22) Filed: Sep. 25, 2017

(65) Prior Publication Data

US 2019/0092563 A1    Mar. 28, 2019

(51) Int. Cl.
| | | |
|---|---|---|
| B65D 88/30 | (2006.01) | |
| B65G 7/00 | (2006.01) | |
| E21B 41/00 | (2006.01) | |
| B65G 33/14 | (2006.01) | |
| B60P 1/04 | (2006.01) | |
| B65G 67/40 | (2006.01) | |
| B65G 65/46 | (2006.01) | |

(52) U.S. Cl.
CPC .............. *B65D 88/30* (2013.01); *B60P 1/045* (2013.01); *B65G 7/00* (2013.01); *B65G 33/14* (2013.01); *B65G 67/40* (2013.01); *E21B 41/00* (2013.01); *B60P 1/04* (2013.01); *B65G 65/46* (2013.01)

(58) Field of Classification Search
CPC .................................................... B65D 88/30

USPC ......................................................... 414/332
See application file for complete search history.

(56) References Cited

U.S. PATENT DOCUMENTS

| | | | | |
|---|---|---|---|---|
| 3,618,801 | A | * | 11/1971 | Blanchard ................. B60P 3/00 298/19 B |
| 6,186,654 | B1 | | 2/2001 | Gunteret, Jr. et al. |
| 6,293,689 | B1 | * | 9/2001 | Guntert, Jr. ........... B28C 7/0495 366/2 |
| 6,474,926 | B2 | * | 11/2002 | Weiss .................... B28C 7/0495 414/332 |
| 6,527,428 | B2 | * | 3/2003 | Guntert, Jr. ........... B28C 7/0495 366/2 |
| 6,749,330 | B2 | | 6/2004 | Allen |
| 7,500,817 | B2 | * | 3/2009 | Furrer ................. A01C 15/003 198/311 |

(Continued)

FOREIGN PATENT DOCUMENTS

| | | |
|---|---|---|
| WO | 2015070326 A1 | 5/2015 |
| WO | 2016032438 A1 | 3/2016 |
| WO | 2017049264 A1 | 3/2017 |

*Primary Examiner* — Mark C Hageman
(74) *Attorney, Agent, or Firm* — Rachel E. Greene (57) ABSTRACT

A technique facilitates delivery of bulk materials at a desired site, such as a wellsite. According to an embodiment, a silo is pivotably mounted to a trailer, such as an over-the-road trailer. An actuator is coupled between the silo and the trailer to enable transition of the silo between a transverse position for transport and an upright position which facilitates outflow of the bulk material. The system also may comprise various other features used alone or in combination, such as pivotable wings, a foldable trailer, and an adjustable suspension which allows a frame of the trailer to be positioned firmly on the ground.

9 Claims, 6 Drawing Sheets

(56) References Cited

U.S. PATENT DOCUMENTS

| | | | |
|---|---|---|---|
| 8,961,096 B2 * | 2/2015 | Herman | B60P 1/486 |
| | | | 222/168 |
| 9,315,294 B2 | 4/2016 | Herman et al. | |
| 9,428,094 B2 * | 8/2016 | Herman | B60P 1/6427 |
| 9,428,348 B2 * | 8/2016 | Teichrob | B65G 63/008 |
| 2012/0024738 A1 | 2/2012 | Herman et al. | |
| 2012/0134772 A1 | 5/2012 | Herman et al. | |
| 2014/0309936 A1 | 10/2014 | Abbassian et al. | |
| 2015/0044003 A1 | 2/2015 | Pham | |
| 2015/0044004 A1 | 2/2015 | Pham et al. | |
| 2015/0166135 A1 | 6/2015 | Pham | |
| 2016/0230934 A1 | 8/2016 | Friesen et al. | |

* cited by examiner

SYSTEM AND METHODOLOGY FOR DELIVERING BULK MATERIAL AT A WORK SITE

BACKGROUND

Hydrocarbon fluids such as oil and natural gas are obtained from a subterranean geologic formation, referred to as a reservoir, by drilling a well. The well may contain at least one wellbore into which various types of equipment are deployed in preparing the wellbore for production. Sometimes the well is prepared via well treatment operations performed prior to delivering completion equipment downhole so as to produce the well. The well treatment operations may involve delivery of bulk material to enable specific well treatments. For example, bulk material in the form of cement powder may be provided at the wellsite and delivered to a mixing unit during performance of a wellsite cementing service. The bulk material also may comprise proppant material for use in a well fracturing operation. In some applications, silos are constructed or positioned at the wellsite to provide a delivery source for the bulk material. However, existing silos have various limitations, such as limitations related to transportability, ease of setup, and delivery of the bulk material.

SUMMARY

In general, a system and methodology are provided to facilitate delivery of bulk materials at a desired work site, such as a wellsite. According to an embodiment, a silo is pivotably mounted to a trailer, such as an over-the-road trailer. An actuator is coupled between the silo and the trailer to enable transition of the silo between a transverse position for transport and an upright position which facilitates outflow of the bulk material. The system also may comprise various other features used alone or in combination, such as pivotable wings, a foldable trailer, and an adjustable suspension which allows a frame of the trailer to be positioned firmly on the ground.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology to facilitate delivery of bulk materials at a desired work site, such as a wellsite. According to an embodiment, a silo is constructed for carrying bulk material, such as dry, bulk material. Examples of bulk material include cement, proppant, or other materials which may be delivered to a corresponding component, e.g. blender, located at the wellsite or other location. In some applications, the silo may be a multi-compartment silo having a plurality of compartments in which the bulk material may be stored prior to delivery via outflow of the bulk material through an appropriate feeder.

The silo may be pivotably mounted to a trailer, such as an over-the-road trailer. The trailer may be of the type which may be coupled to a tractor to enable transportation along public highways or other roadways to enable delivery of the trailer to the desired wellsite or other location. An actuator is coupled between the silo and the trailer to enable transition of the silo between a transverse position for transport and an upright position which facilitates outflow of the bulk material. The system also may comprise various other features used alone or in combination, such as pivotable wings, a foldable trailer, and an adjustable suspension which allows a frame of the trailer to be positioned firmly on the ground.

According to an embodiment, the trailer, silo, and corresponding components provide a mobile bulk material delivery system which may be used in a variety of applications. For example, the bulk material delivery system may be used for delivering and metering cement powder into a mixing unit for a wellsite completion service. However, the bulk material delivery system may be used for other operations, such as delivery of proppant to equipment used for well fracturing operations. The bulk material delivery system also may be used to enable controlled delivery of other dry materials in many types of well operations or other non-well related operations.

In some applications, the bulk material delivery system combines the trailer with a multi-compartment silo which is integrated with a frame, e.g. chassis, of the trailer so the silo can be articulated from a lowered, stowed, on-road position to a raised, upright position to facilitate delivery of the bulk material. In some embodiments, an adjustable suspension may be combined with the frame to enable the trailer frame to lie on the ground for greater stability during deployment of the silo to the upright position. Additionally, outrigger structures, e.g. wings, may be coupled with the trailer and may be articulated from an upright, stowed position for on-road transport to a lateral, e.g. horizontal, position to support the silo during operation. The wings may be locked in the lateral position to provide increased stability to the trailer and silo during deployment and operation of the silo.

In some embodiments, the bulk material delivery system also may comprise a conveyor system coupled with the trailer. By way of example, the conveyor system may be a sliding conveyor system located at the rear of the trailer so that the conveyor may be slid from an on-road stowed position to a deployed position. In the deployed position, a feeder of the silo is aligned with an inlet of the conveyor system when the silo is actuated to the upright, operational position. Depending on the parameters of a given environment and operation, a seal may be positioned between the feeder and the inlet to form a weather resistant seal which protects the bulk material from moisture during delivery of the bulk material from the silo into the conveyor.

Additionally, force-sensing load cells, e.g. force-sensing load pins, may be positioned between the silo and the chassis or at other suitable locations to enable monitoring of the bulk material. For example, the load cells may be used to provide the bulk material delivery system with the capability of metering bulk material from the silo. The load cells may be operated according to a loss-in-weight technique during delivery of bulk material to provide greater precision with respect to metering of the dry bulk material.

Figure 1:
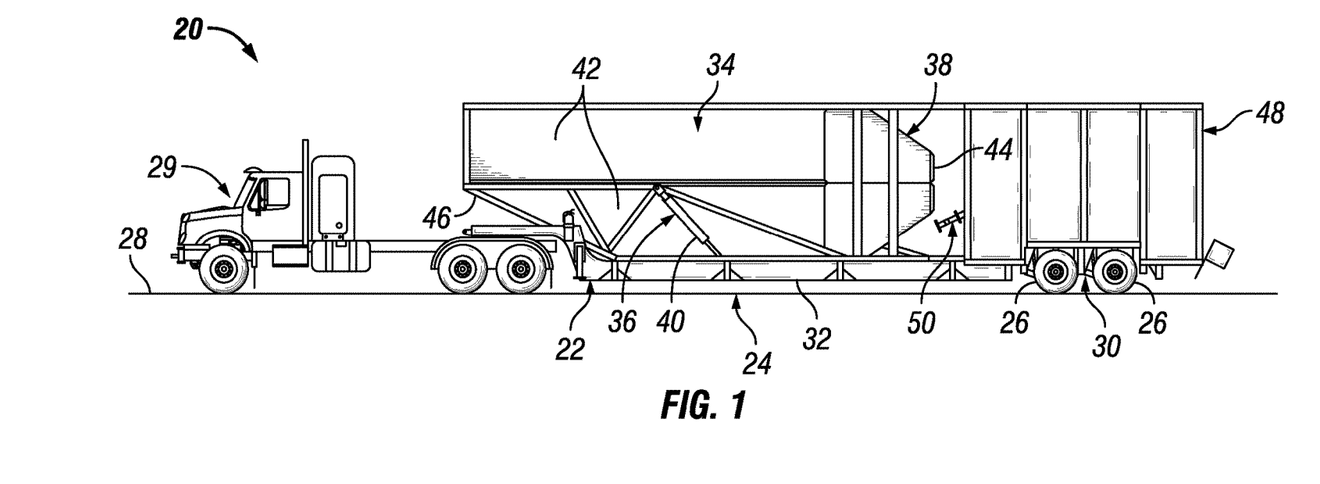
FIG. 1 is a side view of an example of a bulk material delivery system comprising a trailer connected to an over-the-road tractor, according to an embodiment of the disclosure.

Referring generally to FIG. 1, an embodiment of a bulk material delivery system 20 is illustrated. In this example, the bulk material delivery system 20 comprises a trailer 22 constructed to provide mobility with respect to the bulk material delivery system 20. For example, the trailer 22 may be constructed for over-the-road use to enable movement of system 20 over available public highways and other roads to desired work sites, e.g. wellsites. The trailer 22 may comprise a frame 24, e.g. a chassis, to which a plurality of wheels 26 is mounted to enable rolling movement along a ground surface 28, e.g. roadway or wellsite surface. The trailer 22 may be pulled along a roadway or other ground surface 28 by a suitable tractor 29, e.g. a semi-style tractor, or other appropriate pulling vehicle.

In some embodiments, an adjustable suspension 30 may be coupled between the plurality of wheels 26 and the frame 24. The adjustable suspension 30 is actuatable to move the frame 24 between a raised position (see FIG. 1) and a lowered position which allows the frame 24 to rest on the ground surface 28 (see FIG. 2). By way of example, the adjustable suspension 30 may be in the form of an air-bag suspension although other types of adjustable suspensions, e.g. hydraulically adjustable suspensions or electro-mechanically adjustable suspensions, may be employed. In some applications, the trailer 22 may be constructed as a lowboy trailer having a lowered mid-frame section 32 which may facilitate lowering the trailer 22 onto the ground surface 28.

According to the embodiment illustrated, the bulk material delivery system 20 also comprises a silo 34 used to deliver bulk material, such as a dry, bulk material. The silo 34 may be pivotably mounted on the frame 24 and may be movable via an actuator 36. The actuator 36 may be selectively operated to move the silo 34 between a transverse position for transport and an upright position for delivery of the bulk material through, for example, a feeder 38. Actuator 36 may comprise various types of actuators, but one embodiment utilizes at least one telescopic hydraulic cylinder 40, e.g. a plurality of telescopic hydraulic cylinders 40.

Figure 2:
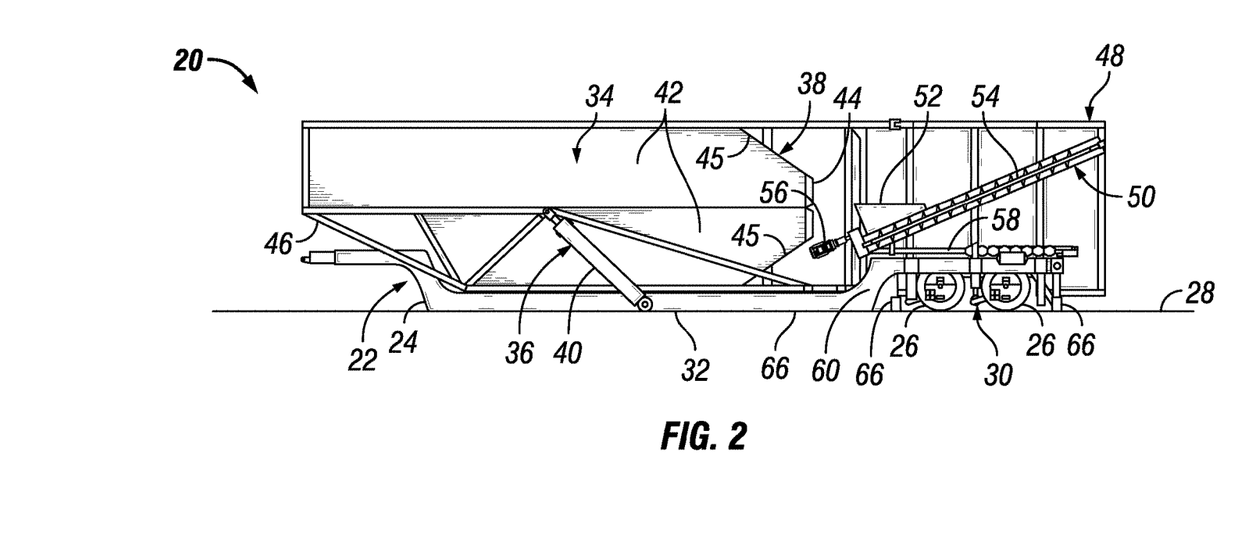
FIG. 2 is a side view of the bulk material delivery system illustrated in FIG. 1 in which the suspension of the trailer has been actuated to place a frame of the trailer on the ground, according to an embodiment of the disclosure.

Depending on the parameters of a given application, the silo 34 may have various configurations. For example, silo 34 may be a single compartment silo or a multi-compartment silo having multiple separated compartments 42, as illustrated in FIGS. 1 and 2. In such an embodiment, each compartment 42 may have walls which are generally smooth and vertical to facilitate movement of the bulk material down through feeder 38 when the silo 34 is transitioned to an upright position. The feeder 38 may employ sloped sides oriented to deliver the bulk material to a controllable release mechanism 44, such as a release mechanism comprising multiple controllable knife gates. In some embodiments, the feeder 38 may incorporate or work in cooperation with a flow mechanism(s) 45, e.g. aeration/fluidization pads and/or vibration mechanisms, to facilitate and encourage material flow from the silo 34, through the feeder 38, and out through release mechanism 44 for delivery to, for example, a conveyor. Support may be provided to the compartments 42 by a suitable silo framework 46 which also may be used to pivotably engage the silo 34 with the frame 24.

Referring again to FIGS. 1 and 2, the bulk material delivery system 20 may further comprise at least one wing 48, e.g. a plurality of wings 48. The wings 48 are pivotably mounted to the frame 24 to enable movement between different positions. For example, each wing 48 may be pivoted between a raised position for transport and a lateral position, e.g. horizontal position, for engaging the ground surface 28 to provide support during deployment and operation of silo 34. The wings 48 may comprise various types of outrigger structures in various shapes and sizes.

Figure 3:
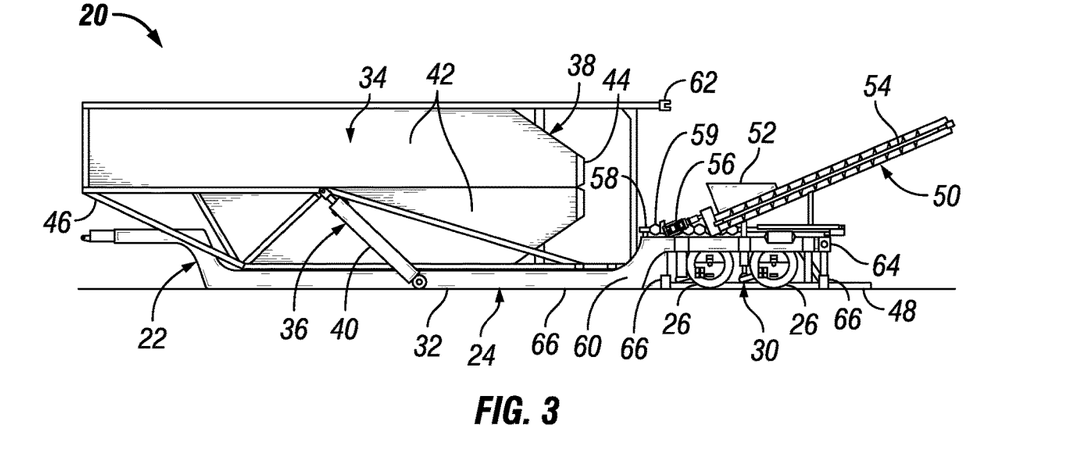
FIG. 3 is a side view of the bulk material delivery system illustrated in FIG. 2 in which a support wing has been pivoted to a lateral supporting position and a conveyor has been actuated from a transport position to an operational position, according to an embodiment of the disclosure.
Figure 4:
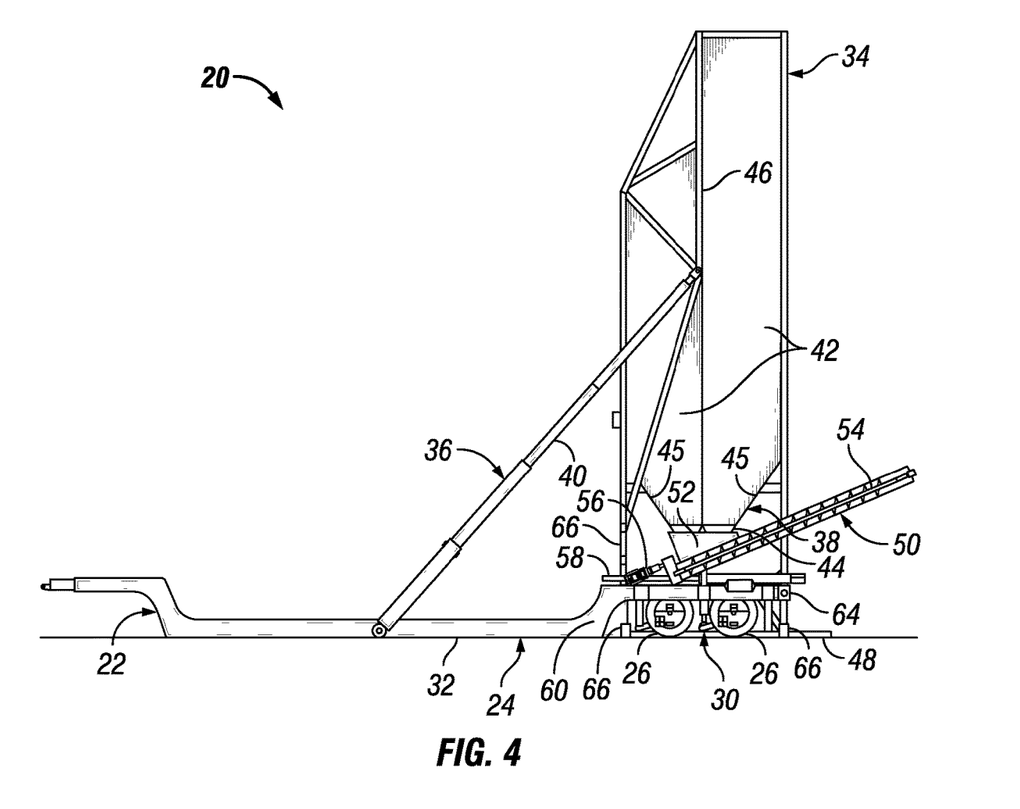
FIG. 4 is a side view of the bulk material delivery system illustrated in FIG. 3 in which a silo has been actuated from a transverse, transport position to an operational, upright position, according to an embodiment of the disclosure.

According to one embodiment, the wings 48 may be pivoted laterally outwardly from a generally vertical position to the lateral position in which wings 48 extend from the sides of trailer frame 24. In some embodiments, both the wings 48 and the frame 24 are lowered into engagement with ground surface 28 to provide substantial support during deployment of silo 34 and delivery of the bulk materials, as illustrated in FIGS. 3 and 4. It should be noted the wing 48 in the foreground of FIG. 1 has not been shown in FIGS. 2, 3, 4 so as to better illustrate components of the bulk material delivery system 20. However, each of the wings 48 is illustrated in the orthogonal view of FIG. 5 which shows the silo 34 deployed to the upright, operational position.

With additional reference to FIGS. 2-5, the bulk material delivery system 20 also may comprise a conveyor 50 coupled to frame 24. By way of example, the conveyor 50 may comprise an inlet 52 for receiving bulk material from feeder 38 of silo 34. In some embodiments, the conveyor 50 comprises an auger 54 which may be enclosed to facilitate movement of dry, bulk material to a mixer or other desired component or location. The auger 54 may be operated by a motor 56, such as electric motor or hydraulic motor. However, conveyor 50 may comprise other types of conveyors, such as belt conveyors, pneumatic conveyors, or other conveyors suitable for a given application.

Additionally, the conveyor 50 may be movably mounted on frame 24 for transition between a transport position (see FIG. 2) and an operational position where inlet 52 is positioned for alignment with feeder 38, as illustrated in FIGS. 3 and 4. For example, the conveyor 50 may be slidably mounted on rails 58 which facilitate ease of shifting conveyor 50 between transport and operational positions via a suitable actuator, e.g. a hydraulic cylinder. The rails 58 may be lubricated rails attached to the trailer frame 24 and protected from dirt and other debris via guards 59, e.g. bellows-type rubber guards. The ability to move conveyor 50 along rails 58 enables a more compact configuration of the overall bulk delivery system 20, e.g. a shorter configuration, when readied for transport.

To enable deployment of silo 34 from the lateral transport position to the upright operational position, the silo 34 may be pivotably mounted on supports 60, e.g. load pins, between trailer fame 24 and silo framework 46. The actuator 36 is coupled between trailer frame 24 and silo 34 and may be selectively actuated to pivot the silo 34 from the transverse, transport position to the upright, e.g. vertical, position in which feeder 38 is positioned over inlet 52. As the silo 34 is pivoted to the upright position, additional support features 62 of silo framework 46 are brought into engagement with corresponding stationary supports 64, e.g. load pins, as illustrated in FIGS. 3 and 4.

In some embodiments, a plurality of load cells 66, e.g. force sensing load pins, may be positioned at appropriate locations to monitor the load exerted by silo 34 when in the upright position for delivery of bulk material. The load cells 66 may be used to monitor the amount of bulk material lost from the silo 34 as the bulk material is offloaded from the silo 34 during a given delivery process. For example, use of the load cells 66 enables monitoring of the amount of bulk material delivered to a corresponding mixer during a mixing process, e.g. a cement mixing process or proppant mixing process. In some embodiments, load cells 66, e.g. load pins, may be used to couple silo 34 to framework 46 and/or trailer frame 24 to enable inventory management or other monitoring with respect to quantity and/or type of material in compartments 42 of silo 34.

Figure 5:
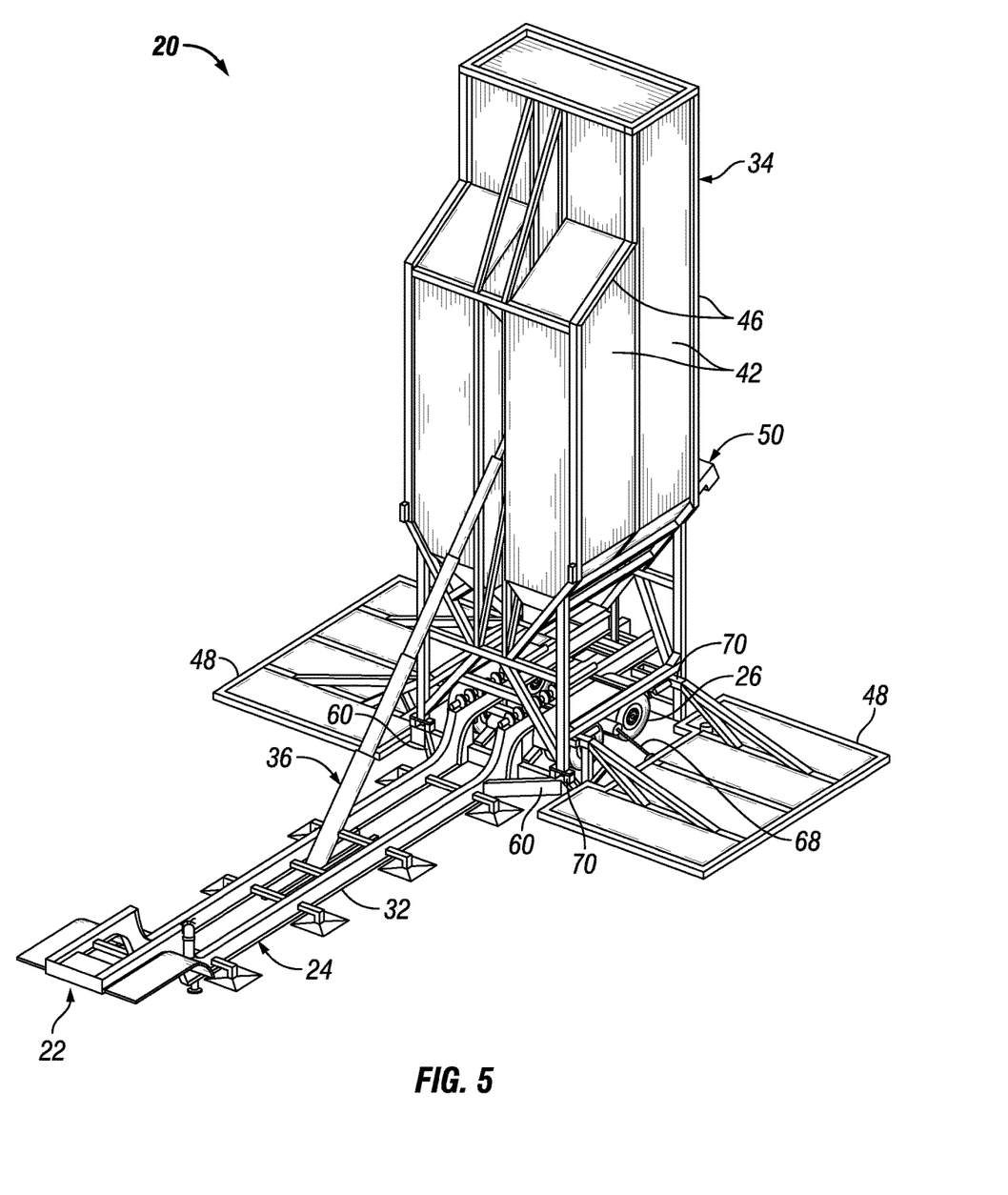
FIG. 5 is an orthogonal view of an embodiment of the bulk material delivery system with the support wings pivoted to the lateral supporting position and the silo actuated to the operational, upright position, according to an embodiment of the disclosure.

Prior to actuating silo 34 to the upright position for delivery of bulk material, the wing or wings 48 may be deployed to the lateral, supporting position. For example, each wing 48 may be transitioned via a suitable wing actuator 68 from the stored position, e.g. vertical stored position, to the lateral supporting position. In some applications, the wings 48 may be transitioned to a generally flat position along the ground surface 28 to provide support during deployment and operation of silo 34. By way of example, the wings 48 may be moved by actuators 68 to the lateral, supporting position via pivotal movement about pivot supports 70 mounted to frame 24, as illustrated in FIG. 5.

The wing actuators 68 may each comprise a variety of suitable actuators, such as hydraulic cylinder actuators, electro-mechanical actuators, winches, or other suitable actuators. The size of the wings 48 also may be selected to provide stable ground support pressure when the silo 34 is in the upright position and fully loaded with bulk material. The silo 34 as well as the wings 48 may be locked in their upright and lateral positions, respectively, by suitable locking members.

By way of example, mechanical or hydraulic locking pins may be actuated to ensure retention of these components in their desired operational positions. In some applications, operation of the locking pins or other types of locking members may be automated to ensure wings 48 are automatically locked into position once deployed and that silo 34 is similarly locked into position once at the upright operational configuration. Appropriate structural supports for the silo actuator 36, wing actuators 68, and locking members may be located on frame 24.

Figure 6:
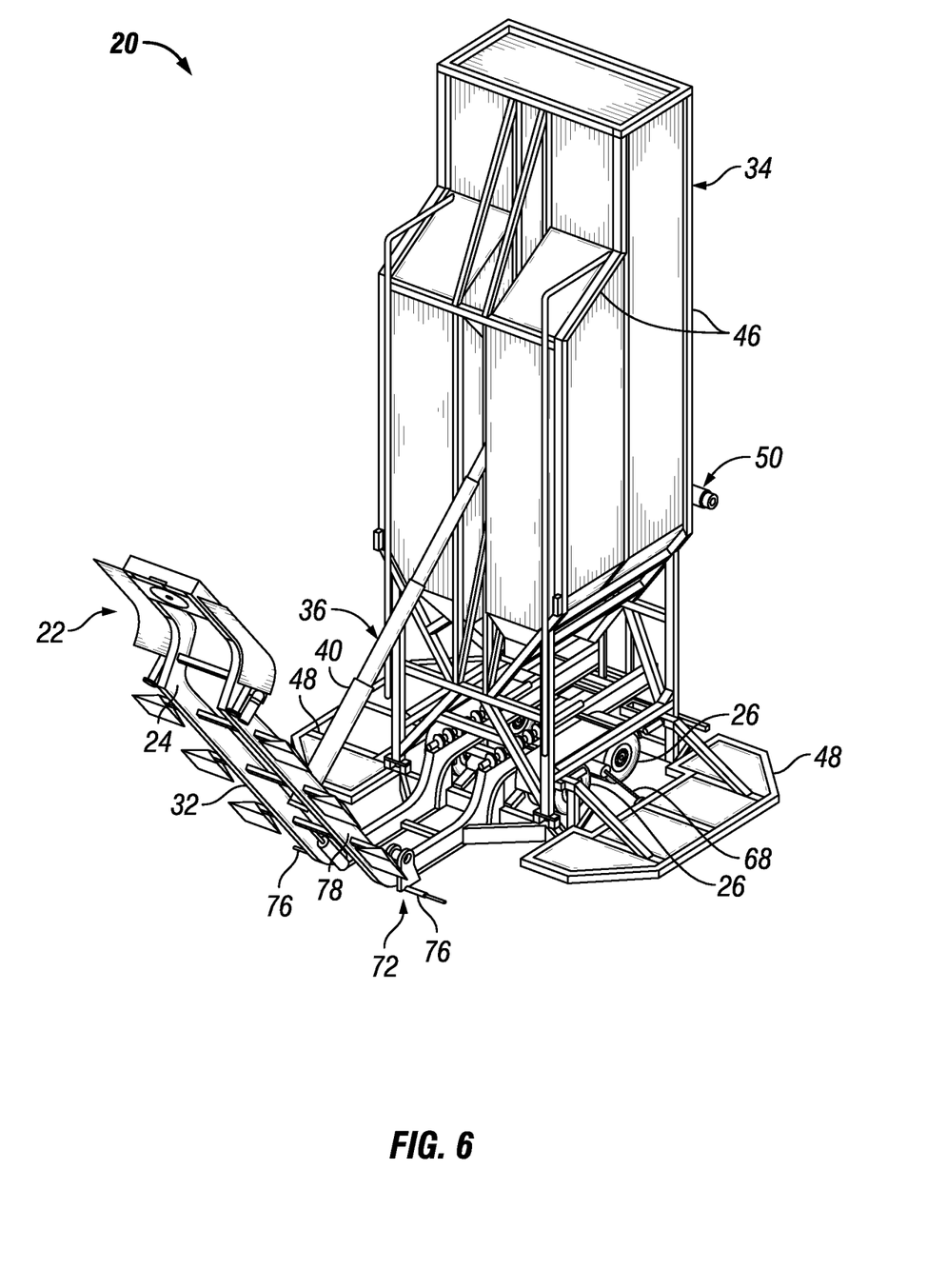
FIG. 6 is an orthogonal view of another embodiment of the bulk material delivery system in which the trailer has at least one fold region to enable reduction of the system footprint, according to an embodiment of the disclosure.
Figure 7:
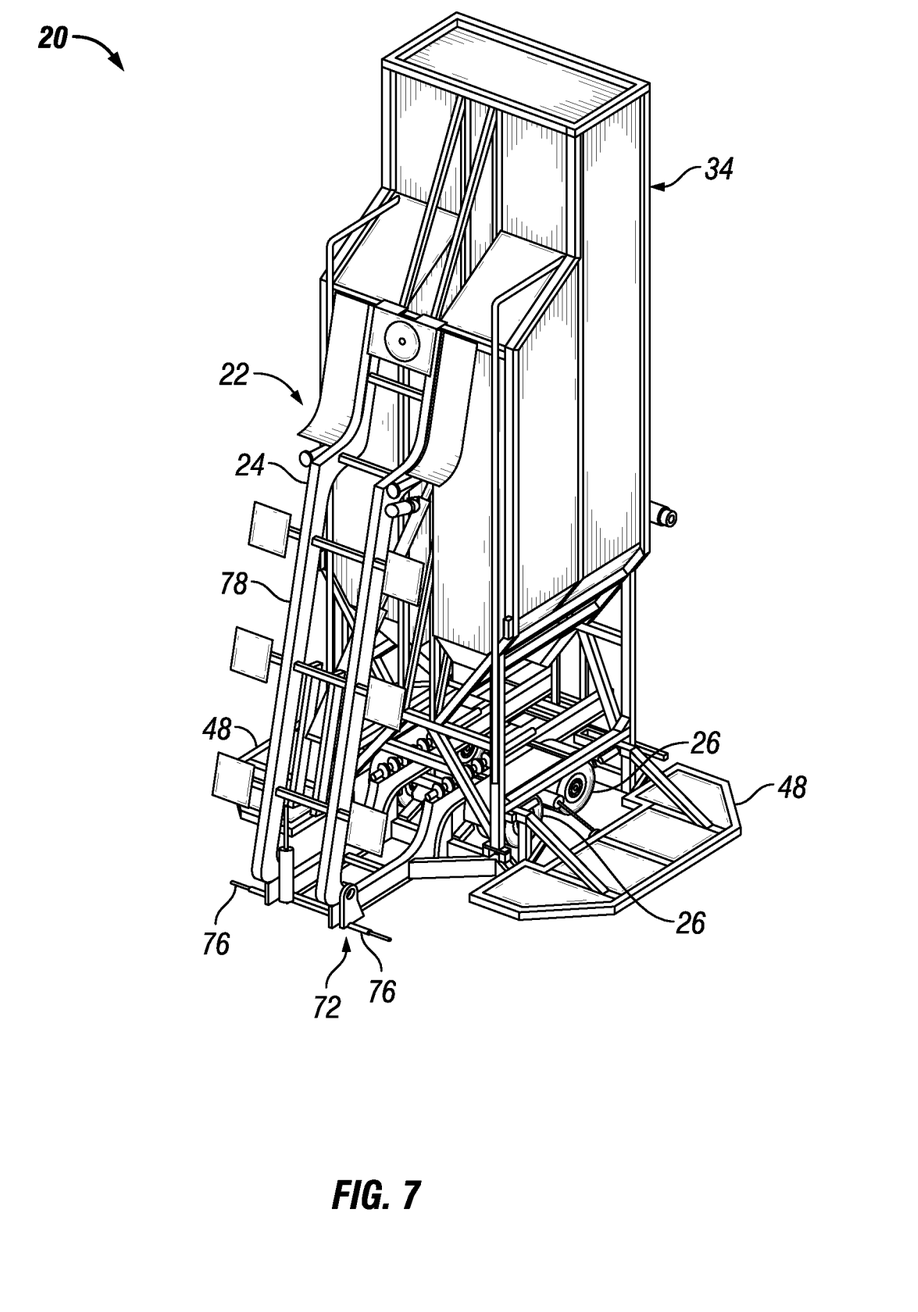
FIG. 7 is an orthogonal view of the bulk material delivery system illustrated in FIG. 6 with the trailer in the fully folded configuration, according to an embodiment of the disclosure.
Figure 8:
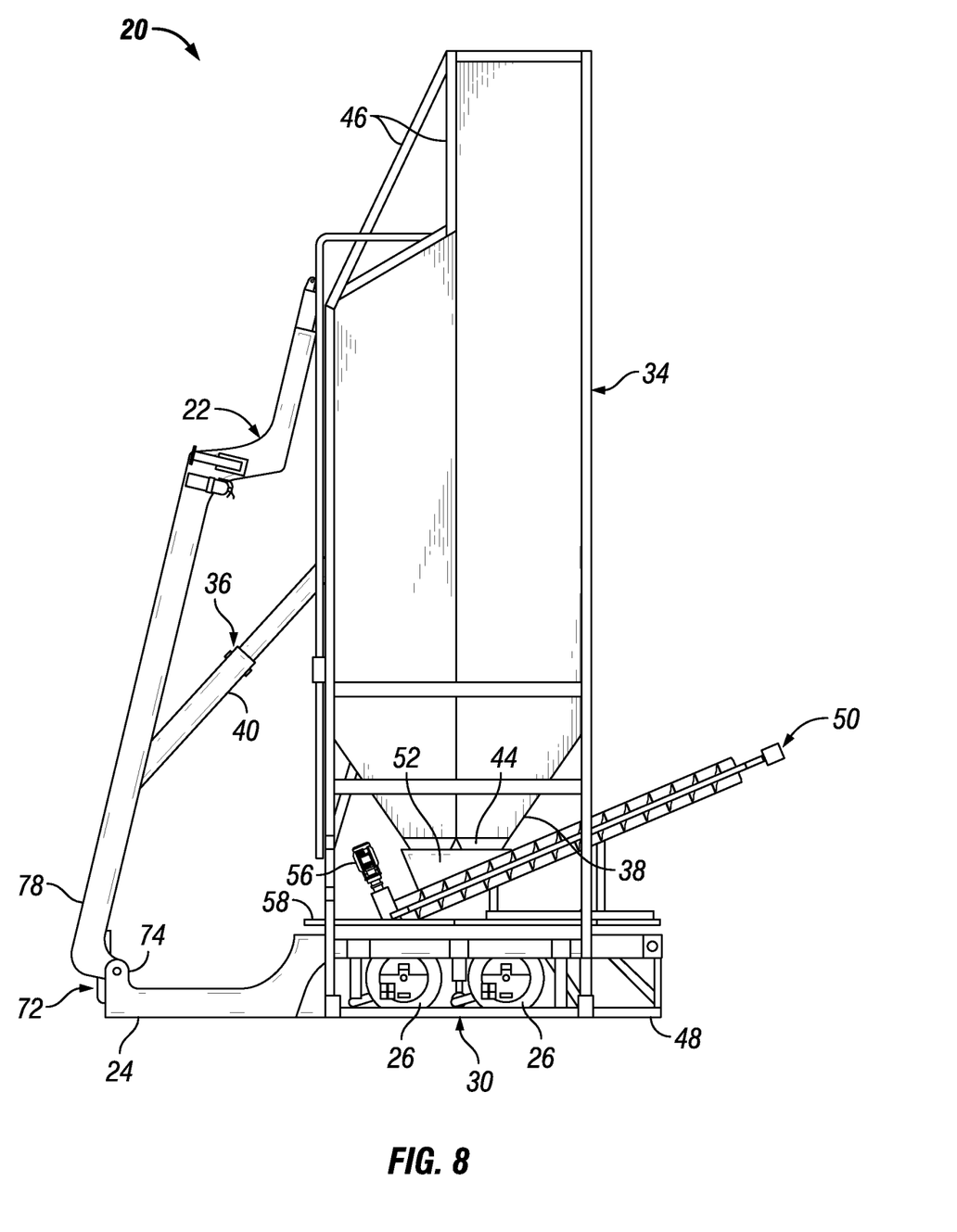
FIG. 8 is a side view of the bulk material delivery system illustrated in FIG. 7 with the trailer in the fully folded configuration, according to an embodiment of the disclosure.

Referring generally to FIGS. 6-8, another embodiment of bulk material delivery system 20 is illustrated. In this embodiment, trailer 22 is constructed with at least one fold region 72, e.g. a joint, which enables folding of trailer 22 to reduce an overall system footprint. In this manner, the silo 34 may remain attached to trailer 22 after the silo 34 has been transitioned to the upright, operational position. Once the silo 34 is raised, the frame 24 of trailer 22 may simply be folded upwardly to reduce the bulk material delivery system footprint, thus providing space for other equipment at the wellsite or other work site.

As illustrated in FIG. 6, an embodiment of trailer 22 utilizes fold region 72 in the form of a pivot 74 and a locking mechanism 76. The pivot 74 may be in the form of pivot pins 78 (see FIG. 8) which enable one portion of frame 24 to be pivoted with respect to another portion of frame 24. The locking mechanism 76 may be in the form of mechanical, hydraulic, electro-mechanical, or otherwise actuated pins or latches which selectively hold trailer 22 in the unfolded, transport position. In this example, the trailer 22 may be transported simply by unfolding trailer frame 24 and actuating the locking mechanism 76 to hold the trailer 22 in the generally flat, transport configuration. Once transitioned to the transport configuration, the trailer 22 may be pulled along a roadway or other ground surface 28 via tractor 29.

A variety of actuators may be used to fold trailer 22 between the transport configuration and the reduced footprint configuration. According to one embodiment, actuator 36 may be used to fold trailer 22. In this example, actuator 36 is used both to transition silo 34 between the lateral and upright positions and to fold trailer 22 at fold region 72. As illustrated, the actuator 36 may again be in the form of a plurality of telescopic, hydraulic cylinders which may be selectively actuated to initially transition silo 34 to the upright, operational position, as illustrated in FIG. 6, and to then fold trailer 22. However, separate or other types of actuators may be used to fold trailer 22, including mechanical actuators, electro-mechanical actuators, winches, and other suitable mechanisms for providing the force to fold trailer 22.

With further reference to FIG. 6, when silo 34 is in the upright position the actuator 36 may be contracted to pull a portion 78 of trailer frame 24 upwardly from the ground surface 28. The actuator 36 may be operated to continually fold trailer 22 until the portion 78 of frame 24 is folded to an upright frame position in proximity with silo 34, as illustrated in FIGS. 7 and 8. Consequently, a substantial portion of the trailer 22 (e.g. portion 78) may be lifted out of the way to provide a reduced footprint, thus allowing additional ground space for other types of equipment.

Depending on the parameters of a given operation, the bulk material delivery system 20 may comprise various other and/or additional components in various shapes, sizes, and arrangements. For example, the trailer 22 may have various shapes and configurations to accommodate silo 34, wings 48, conveyor 50, and/or other components. In some embodiments, various types of adjustable suspensions 30 may be used to selectively transition the trailer 22 between a raised position and a lowered position engaged with ground surface 28. The length and width of trailer 22 may be selected to enable movement of the bulk material delivery system 20 over public roadways.

Similarly, other components of bulk material delivery system 20 may have various shapes and configurations. For example, silo 34 may be a single compartment silo or a multi-compartment silo of various sizes and shapes. The silo framework 46 may have desired configurations to provide sufficient strength and to enable the desired pivoting motion of silo 34 between positions. The wing or wings 48 also may have various sizes and configurations and may be attached to frame 24 via various pivot mechanisms or other mechanisms. Furthermore, the conveyor 50 may have various configurations to facilitate movement of the desired bulk material, e.g. dry-bulk material.

The actuators employed to move silo 34, actuate wings 48, or fold trailer 22, also may have various configurations and may be coupled to the corresponding components via a variety of connectors. The actuators may comprise single units or plural units to achieve the desired motion. Additionally, the actuators may work in cooperation with various lock pins or other locking mechanisms to ensure the components stay in a desired position, e.g. transport position or operational position.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A bulk material delivery system for over-the-road transportation via a semi-style tractor, wherein the bulk material delivery system comprises:
    a frame comprising a first frame portion, a second frame portion pivotally connected to the first frame portion, and a plurality of stationary supports;
    a plurality of wheels permitting rolling movement of the bulk material delivery system along public highways and a ground surface at a wellsite while being pulled by the tractor;
    an adjustable suspension coupled between the plurality of wheels and the frame and actuatable to move the frame between a lowered position in which the frame rests on the ground surface and a raised position in which the frame does not contact the ground surface, wherein the frame, the wheels, and the adjustable suspension are collectively constructed as a lowboy trailer having a lowered mid-frame section that rests on the ground surface when the frame is in the lowered position;
    a silo for delivering dry bulk material to the wellsite and comprising:
        a release mechanism comprising a plurality of controllable knife gates proximate a bottom end of the silo when the silo is in an upright position in which the silo is oriented substantially vertically;
        a feeder having sloped sides oriented to deliver the dry bulk material to the release mechanism;
        a plurality of separated compartments each having walls that are generally smooth and vertical, when the silo is in the upright position, thereby facilitating movement of the dry bulk material down through the feeder to the release mechanism when the silo is in the upright position; and
        a silo framework coupled to the frame and supporting the plurality of separated compartments, wherein the silo framework comprises a plurality of support features;
    an actuator comprising a plurality of telescopic hydraulic cylinders collectively operable to move the silo between a transverse position, in which the silo is oriented substantially horizontally for transportation of the bulk material delivery system over the public highways, and the upright position, for delivery of the dry bulk material through the feeder, wherein:
        movement of the silo from the transverse position to the upright position moves the support features of the silo framework into engagement with corresponding ones of the stationary supports of the frame;
        the first frame portion is horizontal and located under the silo when the silo is in the transverse position;
        the second frame portion is located under the silo when the silo is in the upright position; and
        the actuator is operable to rotate the first frame portion relative to the second frame portion when the silo is in the upright position so that the first frame portion extends upward in proximity with the silo;
    a plurality of wings each pivotably mounted to the frame to permit movement between a raised wing position, for transportation of the bulk material delivery system over the public highways, and a lateral wing position, for engaging the ground surface and thereby providing support while the silo is in the upright position and the frame is in the lowered position and resting on the ground surface;
    a plurality of wing actuators each operable to move a corresponding one of the wings between the raised and lateral wing positions;
    a plurality of rails coupled to the frame;
    a conveyor comprising:
        an inlet for receiving the dry bulk material from the feeder via the release mechanism when the silo is in the upright position;
        an enclosed auger operable to move the dry bulk material away from the inlet; and
        a motor operable to rotate the auger;
        wherein the conveyor is coupled to and movable along the rails between a transport position, for transportation of the bulk material delivery system over the public highways, and an operational position, in which the inlet is aligned with the feeder; and
    a plurality of load cells collectively operable to monitor a load exerted by the silo when the silo is in the upright position and, thereby, monitor an amount of the dry bulk material being offloaded from the silo.

2. A bulk material delivery system for over-the-road transportation via a semi-style tractor, wherein the bulk material delivery system comprises:
    a frame comprising a plurality of stationary supports;
    a plurality of wheels permitting rolling movement of the bulk material delivery system along public highways and a ground surface at a wellsite while being pulled by the tractor;
    an adjustable suspension coupled between the plurality of wheels and the frame and actuatable to move the frame between a lowered position in which the frame rests on the ground surface and a raised position in which the frame does not contact the ground surface;
    a silo for delivering dry bulk material to the wellsite and comprising:
        a release mechanism comprising a plurality of controllable knife gates proximate a bottom end of the silo when the silo is in an upright position in which the silo is oriented substantially vertically;
        a feeder having sloped sides oriented to deliver the dry bulk material to the release mechanism;
        a plurality of separated compartments each having walls that are generally smooth and vertical, when the silo is in the upright position, thereby facilitating movement of the dry bulk material down through the feeder to the release mechanism when the silo is in the upright position; and a silo framework coupled to the frame and supporting the plurality of separated compartments, wherein the silo framework comprises a plurality of support features;

an actuator comprising a plurality of telescopic hydraulic cylinders collectively operable to move the silo between a transverse position, in which the silo is oriented substantially horizontally for transportation of the bulk material delivery system over the public highways, and the upright position, for delivery of the dry bulk material through the feeder, wherein movement of the silo from the transverse position to the upright position moves the support features of the silo framework into engagement with corresponding ones of the stationary supports of the frame;

a plurality of wings each pivotably mounted to the frame to permit movement between a raised wing position, for transportation of the bulk material delivery system over the public highways, and a lateral wing position, for engaging the ground surface and thereby providing support while the silo is in the upright position and the frame is in the lowered position and resting on the ground surface;

a plurality of wing actuators each operable to move a corresponding one of the wings between the raised and lateral wing positions;

a plurality of rails coupled to the frame;

a conveyor comprising:
an inlet for receiving the dry bulk material from the feeder via the release mechanism when the silo is in the upright position;
an enclosed auger operable to move the dry bulk material away from the inlet; and
a motor operable to rotate the auger;
wherein the conveyor is coupled to and movable along the rails between a transport position, for transportation of the bulk material delivery system over the public highways, and an operational position, in which the inlet is aligned with the feeder; and a plurality of load cells collectively operable to monitor a load exerted by the silo when the silo is in the upright position and, thereby, monitor an amount of the dry bulk material being offloaded from the silo.

3. The bulk material delivery system of claim 2 wherein the frame and wheels are collectively constructed as a lowboy trailer having a lowered mid-frame section that rests on the ground surface when the frame is in the lowered position.

4. The bulk material delivery system of claim 2 wherein:
the frame comprises a first portion and a second portion pivotally connected to the first portion;
the first portion is horizontal and located under the silo when the silo is in the transverse position;
the second portion is located under the silo when the silo is in the upright position; and
the actuator is operable to rotate the first portion relative to the second portion when the silo is in the upright position so that the first portion extends substantially upward in proximity with the silo.

5. A bulk material delivery system for over-the-road transportation via a semi-style tractor, wherein the bulk material delivery system comprises:
a frame comprising a plurality of stationary supports;

a plurality of wheels permitting rolling movement of the bulk material delivery system along public highways and a ground surface at a wellsite while being pulled by the tractor;

an adjustable suspension coupled between the plurality of wheels and the frame and actuatable to move the frame between a lowered position in which the frame rests on the ground surface and a raised position in which the frame does not contact the ground surface;

a silo for delivering dry bulk material to the wellsite and comprising:
a release mechanism comprising a plurality of controllable knife gates;
a feeder having sloped sides oriented to deliver the dry bulk material to the release mechanism;
a plurality of separated compartments; and
a silo framework pivotally coupled to the frame and supporting the plurality of separated compartments, wherein the silo framework comprises a plurality of support features; and an actuator comprising a plurality of telescopic hydraulic cylinders collectively operable to move the silo between a transverse position, in which the silo is oriented substantially horizontally for transportation of the bulk material delivery system over the public highways, and an upright position, in which the silo is oriented substantially vertically for delivery of the dry bulk material through the feeder, wherein movement of the silo from the transverse position to the upright position moves the support features of the silo framework into engagement with corresponding ones of the stationary supports of the frame.

6. The bulk material delivery system of claim 5 further comprising:
a plurality of wings each pivotably mounted to the frame to permit movement between a raised wing position, for transportation of the bulk material delivery system over the public highways, and a lateral wing position, in which the wing engages the ground surface and thereby provides support while the silo is in the upright position and the frame is in the lowered position and resting on the ground surface; and
a plurality of wing actuators each operable to move a corresponding one of the wings between the raised and lateral wing positions.

7. The bulk material delivery system of claim 6 further comprising:
a plurality of rails coupled to the frame; and
a conveyor comprising:
an inlet for receiving the dry bulk material from the feeder via the release mechanism when the silo is in the upright position;
an enclosed auger operable to move the dry bulk material away from the inlet; and
a motor operable to rotate the auger;
wherein the conveyor is coupled to and movable along the rails between a transport position, for transportation of the bulk material delivery system over the public highways, and an operational position, in which the inlet is aligned with the feeder.

8. The bulk material delivery system of claim 5 further comprising:
a plurality of rails coupled to the frame; and
a conveyor comprising:
an inlet for receiving the dry bulk material from the feeder via the release mechanism when the silo is in the upright position;

an enclosed auger operable to move the dry bulk material away from the inlet; and a motor operable to rotate the auger;

wherein the conveyor is coupled to and movable along the rails between a transport position, for transportation of the bulk material delivery system over the public highways, and an operational position, in which the inlet is aligned with the feeder.

9. The bulk material delivery system of claim 5 further comprising a plurality of load cells collectively operable to monitor a load exerted by the silo when the silo is in the upright position and, thereby, monitor an amount of the dry bulk material being offloaded from the silo.

* * * * *